INVENTORS
WARFORD A. REANEY
DAVID W. REANEY
BY
Schmieding and Fultz
ATTORNEYS

INVENTORS
WARFORD A. REANEY
DAVID W. REANEY
BY
Schmieding and Fultz
ATTORNEYS

United States Patent Office 3,021,127
Patented Feb. 13, 1962

3,021,127
ROTARY KILN
Warford A. Reaney, 264 W. Lincoln Ave., and David W. Reaney, 487 W. Central Ave., both of Delaware, Ohio
Filed Mar. 17, 1960, Ser. 15,665
6 Claims. (Cl. 263—32)

This invention relates to rotary kilns such as the type used in the calcination of calcium carbonate in the production of commercial lime.

In general the rotary kiln of the present invention includes a rotatably mounted steel drum that includes an intake end for receiving calcium carbonate and an outlet end from which lime is discharged. As the material passes through the rotating drum it passes through a pre-heat zone provided by a plurality of hollow pre-heat sections mounted within the drum eccentric of the axis of rotation thereof. With this arrangement the material is divided into a number of separate portions each of which is conveyed inside one of the plurality of pre-heat sections whereby the material is more efficiently heated.

According to the present invention the walls of the individual pre-heat sections are spaced one from another to provide longitudinally extending passages for the flow of coolant air which flow is continuously supplied to the passages between the individual pre-heat sections. The flow of coolant air is introduced into one end of the passages between the pre-heat sections by a plurality of radially directed intake conduits that connect with holes in the peripheral wall of the kiln, each of said intake conduits being provided with a fan for drawing in air from the environment. The flow of coolant air is released from the passages between the pre-heat sections by a plurality of outlet conduits that connect with circumferentially spaced holes through the wall of the kiln.

It is therefore an object of the present invention to provide a rotary kiln that includes a novel fluid cooled pre-heat section which will operate for long periods of time without structural failure under the high temperatures encountered.

It is another object of the present invention to provide a rotary kiln that includes a pre-heat zone that is efficiently cooled in a novel manner by a plurality of circumferentially spaced intake conduits that connect one end of the interior of the pre-heat zone with the environment, each of said intake conduits being provided with a fan whereby air is drawn in from the environment, passed longitudinally through the pre-heat section and released to the environment at an opposite end thereof.

Further objects and advantages of the present invention will be apparent from the following description, reference being had to the accompanying drawings wherein a preferred form of embodiment of the invention is clearly shown.

Figure 1:
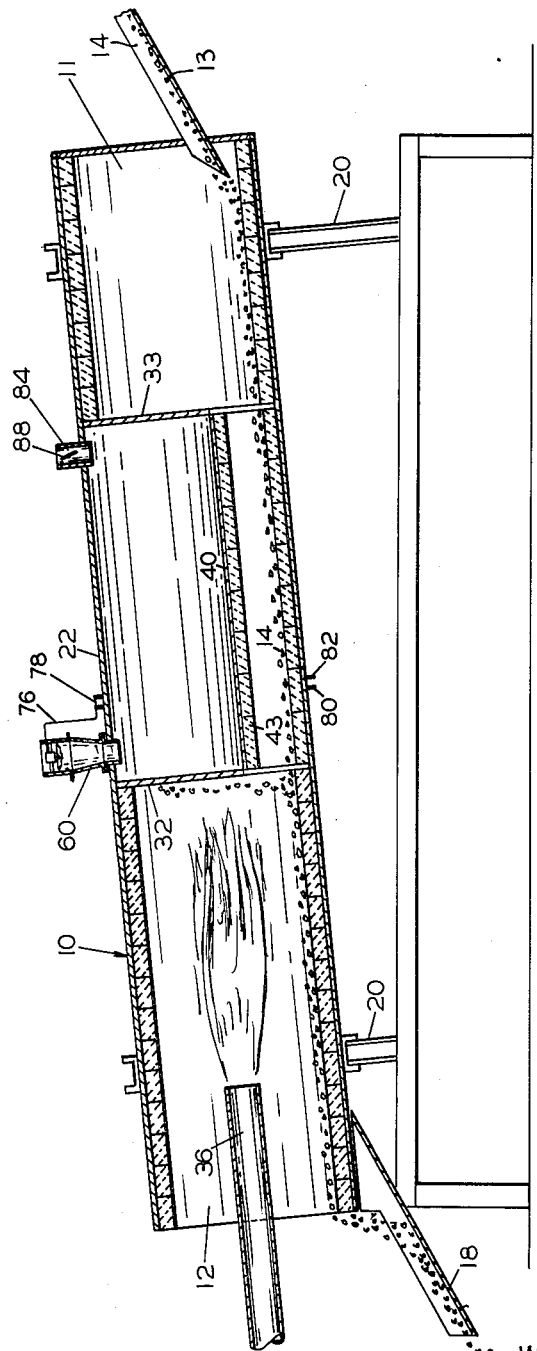
FIG. 1 is a side sectional view of a rotary kiln constructed in accordance with the present invention, the section being taken along the line 1—1 of FIG. 3.

Referring in detail to the drawings, FIG. 1 illustrates a rotay kiln that includes a metallic drum 10 formed of stainless steel or the like, having an intake opening 11 and a discharge opening 12. A delivery chute 13 delivers calcium carbonate 14 to the intake opening of drum 10 and due to the angle of declination of the drum relative to the horizontal, the material 14 progresses along the lower portion of the drum to discharge opening 12 at which point it is released to a discharge chute 18.

Drum 10 is supported on a plurality of trunnions 20 and a prime mover and drive mechanism not illustrated serve to continuously rotate the drum on the trunnion.

Figure 3:
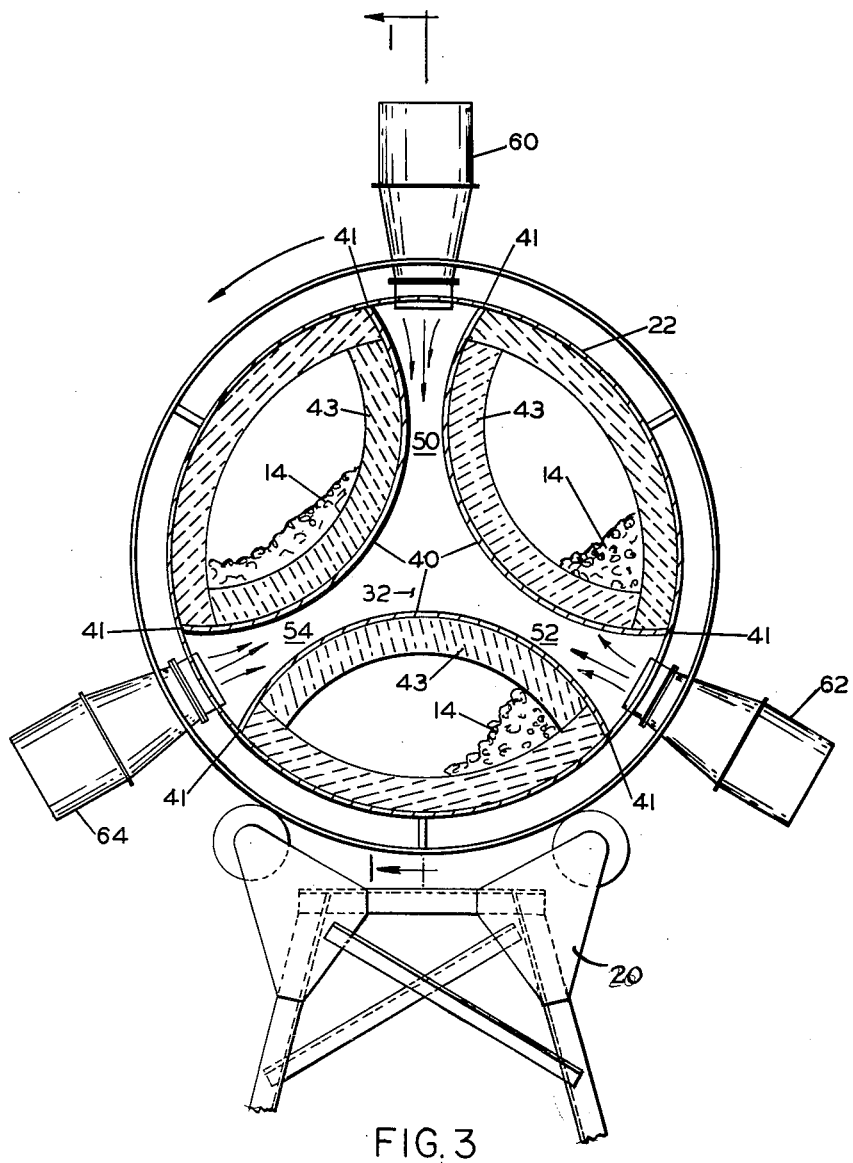
FIG. 3 is an end sectional view through the pre-heat section, said section being taken along the line 3—3 of FIG. 2.

With reference to FIGS. 1 and 3, as the material progresses along the lower section of drum 10 it encounters a pre-heat section 22 which comprises individual pre-heat passages formed by a plurality of arcuate walls 40 secured to the inner surface of drum 10 at 41. A refractory arch construction indicated generally at 43 is built up of a plurality of refractory blocks so as to conform with the shape of the inner surface of drum 10. Since the arcuate metallic walls 40 are isolated from the material by the refractory walls 43 it will be understood that if a flow of coolant air is caused to continuously wipe the convex outer surfaces of arcuate metallic walls 40 such composite wall construction will resist the high temperatures for long periods of time.

As is best seen in FIG. 3, the spaces between metallic walls 40 form coolant passages 50, 52, and 54. The ends of these passages are closed by cap plates 32 and 33, FIG. 1, which may be formed of stainless steel and welded to the ends of metallic walls 40.

The kiln is fired from a fuel discharge line 36 which extends into the discharge end 12 of drum 10.

Figure 2:
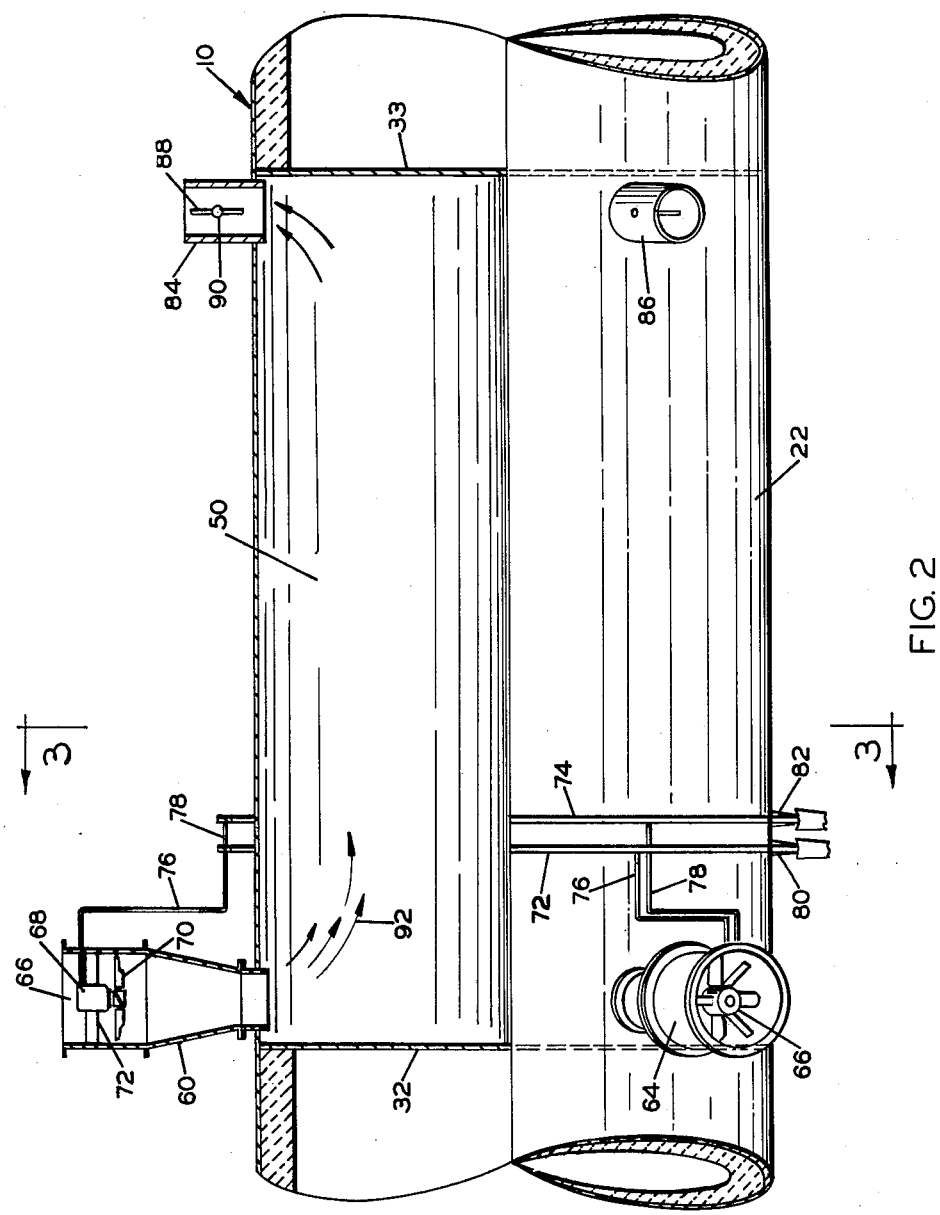
FIG. 2 is a side elevational view, partially in section, of a pre-heat zone comprising a portion of the kiln of FIG. 1.

With reference to FIGS. 2 and 3 the pre-heat section 22 includes a plurality of circumferentially spaced intake conduits 60, 62, and 64, an intake fan 66 that includes an electric motor 68 and a fan blade 70 is mounted in the interior of each of the intake conduits by a plurality of radially extending brackets 72.

The motors 68 of fan 66 are electrically connected to collector rings 72 and 74 by wires 76 and 78. Collector rings 72 and 74 are formed of conductive metal and are engaged by stationary brushes 80 and 82. The brushes are mounted to the frame means adjacent the periphery of the drum and are connected to a source of electrical energy not illustrated. Hence it will be understood that when the drum rotates collector rings 72 and 74 engage brushes 80 and 82 and continuously supply electrical current to the motors 68 of fans 66 via wires 76 and 78.

With reference to FIGS. 1 and 3 the intake end of pre-heat section 22 is provided with a plurality of outlet conduits, two of which are illustrated at 84 and 86.

As is best seen in FIG. 2 each of the outlet conduits 84 and 86 includes an outlet flow control valve 88 pivotally mounted to the conduit by means of a shaft 90.

In operation, the kiln is rotated on the support trunnion 20 by a suitable drive means, not illustrated. The calcium carbonate is continuously supplied to the intake 11 of the kiln and it progresses gradually downwardly and into the pre-heat section 22.

As the drum rotates air from the environment is continuously drawn in through intake conduits 60, 62, and 64 since the intake fans 66 are energized via brushes 80 and 82 and collector rings 72 and 74. The inwardly directed flow of air curves rearwardly as indicated by the arrows 92, flows along the passages 50, 52, and 54, and thence outwardly through discharge conduits 84 and 86 to the environment. As the flow passes along passages 50, 52, and 54 it wipes the arcuate walls 40 in heat exchange relationship therewith. This prevents the build-up of heat in the spaces between the individual pre-heat sections formed by the arcuate walls and prevents the destruction of the combined metallic and refractory arch constructions.

While the form of embodiment of the present invention as herein disclosed constitutes a preferred form, it is to be understood that other forms might be adopted, all coming within the scope of the claims which follow.

We claim:
1. A kiln comprising, in combination, a drum including a drum wall provided with a plurality of circumferentially spaced fluid intake openings and a plurality of circumferentially spaced fluid discharge openings, said discharge openings being spaced longitudinally from said intake openings; mounting means for rotatably supporting said drum for rotation about a longitudinal axis; a plurality of inner walls mounted on and spaced from said drum wall and forming therewith a plurality of pre-heater sections disposed radially of said axis of rotation, said inner walls including inner surfaces spaced from one another to form together with said drum wall a longitudinally extending passage means connecting said fluid intake and discharge openings; cap plates on the ends of said inner walls and forming end closures for said longitudinally extending passage means; and a plurality of coolant fans carried in said drum, each of said fans being disposed at a respective one of said openings for producing flows of coolant through said longitudinally extending passage means.

2. A kiln comprising, in combination, a drum rotatably mounted about a longitudinal axis of rotation and including a drum wall provided with a plurality of circumferentially spaced fluid intake openings and a plurality of circumferentially spaced fluid discharge openings, said discharge openings being spaced longitudinally from said intake openings; mounting means for rotatably supporting said drum for rotation about a longitudinal axis; a plurality of inner walls mounted on and spaced from said drum wall and forming therewith a plurality of preheater sections disposed radially of said axis of rotation, said inner walls including inner surfaces spaced from one another to form together with said drum wall a longitudinally extending passage means connecting said fluid intake and discharge openings; cap plates on the ends of said inner walls and forming end closures for said longitudinally extending passage means; a plurality of coolant fans carried in said drum, each of said fans being disposed at a respective one of said openings for producing flows of coolant through said longitudinally extending passage means; an annular conductor carried by said drum for rotation therewith, said fans including electric motors connected to said annular conductor; and a stationary brush in slidable engagement with said annular conductor, said brush being connected with a source of electrical energy.

3. A kiln comprising, in combination, a drum rotatably mounted about a longitudinal axis of rotation and including a drum wall provided with a coolant intake opening longitudinally spaced from a coolant discharge opening; mounting means for rotatably supporting said drum for rotation about a longitudinal axis; a plurality of inner walls mounted on and spaced from said drum wall and forming therewith a plurality of preheater sections disposed radially of said axis of rotation, said inner walls including inner surfaces spaced from one another to form together with said drum wall a longitudinally extending coolant passage means connecting said coolant intake and discharge openings; cap plates on the ends of said inner walls and forming end closures for said longitudinally extending passage means; a coolant fan mounted to said drum at one of said openings for producing flows of coolant through said longitudinally extending passage means; and a coolant flow control valve for one of said openings.

4. A kiln comprising, in combination, a drum rotatably mounted about a longitudinal axis of rotation and including a drum wall provided with a coolant intake opening longitudinally spaced from a coolant discharge opening; mounting means for rotatably supporting said drum for rotation about a longitudinal axis; a plurality of inner walls mounted on and spaced from said drum wall and forming therewith a plurality of preheater sections disposed radially of said axis of rotation, said inner walls including inner surfaces spaced from one another to form together with said drum wall a longitudinally extending coolant passage means connecting said coolant intake and discharge openings; cap plates on the ends of said inner walls and forming end closures for said longitudinally extending passage means; a coolant fan mounted to said drum at one of said openings for producing flows of coolant through said longitudinally extending passage means; an annular conductor carried by said drum for rotation therewith, said fan including an electric motor connected to said annular conductor; and a stationary brush in slidable engagement with said annular conductor, said brush being connected with a source of electrical energy.

5. The apparatus defined in claim 1 wherein said inner walls of said preheater sections are arcuate and include spaced longitudinal edges secured to said drum to form together with said drum wall, preheater sections of substantially elliptical cross-section, said arcuate inner walls including concave outer surfaces, provided with layers of refractory material lining said sections, and convex inner surfaces spaced from one another to form said longitudinally extending passage means.

6. The apparatus defined in claim 3 wherein said inner walls of said preheater sections are arcuate and include spaced longitudinal edges secured to said drum to form together with said drum wall, preheater sections of substantially elliptical cross-section, said arcuate inner walls of said sections including concave outer surfaces, provided with layers of refractory material lining said sections, and convex inner surfaces spaced from one another to form said longitudinally extending passage means.

References Cited in the file of this patent
UNITED STATES PATENTS

| | | |
|---|---|---|
| 864,816 | Warren | Sept. 3, 1907 |
| 1,238,394 | Eldred | Aug. 28, 1917 |
| 1,480,319 | Vogel-Jorgensen et al. | Jan. 8, 1924 |
| 2,073,994 | Queneau | Mar. 16, 1937 |
| 2,889,143 | Reaney et al. | June 2, 1959 |